INVENTORS.
DANIEL J. NESIN
LELAND D. GREEN
ARMAND R. TANGUAY
BY
Ronald Zibelli
ATTORNEY Sept. 19, 1967 D. J. NESIN ETAL 3,342,126

MULTIPLE ELECTROGRAPHIC PRINTER HAVING PLURAL UNITS CONNECTED TO COMMON DRIVE MEANS

Filed March 17, 1966 8 Sheets-Sheet 2

INVENTORS.
DANIEL J. NESIN
LELAND D. GREEN
ARMAND R. TANGUAY

BY Ronald Zibelli
ATTORNEY

Sept. 19, 1967 D. J. NESIN ETAL 3,342,126

MULTIPLE ELECTROGRAPHIC PRINTER HAVING PLURAL UNITS CONNECTED TO COMMON DRIVE MEANS

Filed March 17, 1966 8 Sheets-Sheet 3

INVENTORS.
DANIEL J. NESIN
LELAND D. GREEN
ARMAND R. TANGUAY

BY Ronald Zibelli

ATTORNEY

Sept. 19, 1967 D. J. NESIN ETAL 3,342,126

MULTIPLE ELECTROGRAPHIC PRINTER HAVING PLURAL UNITS CONNECTED TO COMMON DRIVE MEANS

Filed March 17, 1966 8 Sheets-Sheet 4

INVENTORS.
DANIEL J. NESIN
LELAND D. GREEN
ARMAND R. TANGUAY

BY

Ronald Zibelli
ATTORNEY

INVENTORS.
DANIEL J. NESIN
LELAND D. GREEN
BY ARMAND R. TANGUAY
Ronald Zibelli
ATTORNEY INVENTORS.
DANIEL J. NESIN
LELAND D. GREEN
BY ARMAND R. TANGUAY
Ronald Zibelli
ATTORNEY INVENTORS.
DANIEL J. NESIN
LELAND D. GREEN
BY ARMAND R. TANGUAY
Ronald Zebell
ATTORNEY

INVENTORS.
DANIEL J. NESIN
LELAND D. GREEN
ARMAND R. TANGUAY

BY Ronald Zibelli
ATTORNEY 3,342,126

MULTIPLE ELECTROGRAPHIC PRINTER HAVING PLURAL UNITS CONNECTED TO COMMON DRIVE MEANS

Daniel J. Nesin, Arcadia, Leland D. Green, Sierra Madre, and Armand R. Tanguay, Pasadena, Calif., assignors to Xerox Corporation, Rochester, N.Y., a corporation of New York Filed Mar. 17, 1966, Ser. No. 535,247
4 Claims. (Cl. 101—90)

ABSTRACT OF THE DISCLOSURE

This invention relates to a multiple copy electrographic recorder having a plurality of individual printers mounted on tracks in a common frame, each unit being removably coupled to a common drive by a clutch mechanism. Each printer contains character electrodes located on a cycling carrier and the common drive mechanism generates an output signal which is the analog of the cyclical position of the carriers.

A great number of electrical printing and recording techniques have been developed in the past. Some of these are based on sparking or electrical burning of specially prepared or coated recording papers in a pattern to produce the desired images. Although the techniques of this type have been used in limited applications, they suffer from obvious disadvantages inherent in any system in which such a burning process is employed. For example, they produce smoke in the area adjacent the machine, they produce dirt and dust inside the machine which tends to clog it up and cause it to misprint and the specially prepared recording papers frequently employing two, three, or even more coated layers are too expensive for wide-spread general use. In addition, this type of burning technique has been found to be too slow for use in high speed communications printers or high speed computer output printers where a reliable high speed system might offset the cost and other inconveniences of this technique.

In order to overcome the many difficulties inherent in electrical spark recording, a technique known as "tesiprinting" was developed. This technique which is more fully described in British Patent 734,909 to Carlson employs at least one shaped electrode and a backing electrode which are spaced apart to form a gap. Any suitable paper, plastic, plastic coated paper, or other recording web capable of holding an electrostatic charge is placed in the recording gap and an electrical field of sufficient intensity to initiate an ionizing field discharge is then applied across the gap forming an electrostatic charge pattern on the recording web which conforms in shape with the face of the shaped electrode. This electrostatic charge pattern is then developed as with finely divided, colored electroscopic marking particles which are fixed to the recording web to form a permanently visible image. While Tesirecording is extremely fast, simple, and quiet in operation, the electrical discharge required for this type of printing is less than 100% reliable under ordinary atmospheric conditions. This lack of reliability occurs because naturally formed, ionized air molecules must be present in the printing gap when the pulse is applied so that the discharge will take place. Although the probability of a discharge occurring in the gap at any one time will generally run to 98 or 99%, the severe reliability requirement of computer printers and high speed communications printers have required the use of special techniques and mechanisms for improving the reliability of this type of system. Typically, these improved techniques have involved the redirection of continuous discharges in the recording gap, the use of special electronegative gases, and the like. At the same time that these modified techniques have improved the reliability of Tesiprinting systems, they have also added significantly to its cost and complexity.

Another problem with prior art electrostatic printing devices is that they must be held in a standby condition ready for printing input which may well come at irregular intervals. This means, for example, that a character drum or other device which presents different alphanumerically character shaped electrodes in quick succession at the printing gap must be kept running and that the heat fixing device which fuses the thermoplastic marking particles employed to develop the electrostatic image formed on the recording sheet must be kept at or very near to the fusing temperature and that the recording web must be threaded in the machine, so that it can go into operation instantaneously. Since the use of a continuous recording web is required for any really high speed system, the aforementioned requirements may well result in burnishing or tearing of the recording web at the printing gap or in charring or tearing of the web at the fusing station.

It is, therefore, an object of this invention to provide a high speed electrostatic printer of novel design.

Another object of the invention is to provide a new method of electrostatic printing.

A still further object of the invention is to provide a new method and apparatus for electrostatic printing of extremely high reliability.

Yet another object of the invention is to provide a novel recording web feeder adapted to advance the web through the printer one line at a time under controlled tension in conjunction with the operation of the print head.

A further object of the invention is to provide a novel method and apparatus for electrostatic printing incorporating extremely high output printing speed in which the system may be held in a continuous standby condition, ready for instantaneous operation.

A still further object of the invention is to provide a novel fusing method and apparatus incorporating the advantages of instantaneous fusing readiness with no damage to the recording web during standby operation.

An additional object of the invention is to provide an electrostatic printing apparatus with a multiple copy output capability.

Generally speaking, the apparatus of the invention incorporates a device for presenting a plurality of differently shaped alphanumeric character electrodes in very rapid succession at a printing station. By providing a plurality of these printing stations arranged in a line, a complete line of type may be recorded on the recording web at one time. A backing electrode is also provided for each printing station on the opposite side of the recording web from the alphanumeric character shaped electrode so that recording may be accomplished by applying a pulsed voltage between the desired character electrode and the backing electrode at one particular station to record a latent electrostatic image of the desired character at the printing station. Character selection is provided by applying only a short duration pulse during the time when the desired shaped electrode is at the printing station. Although the whole group of different character shaped electrodes is cycled through the printing station, continuously at a very rapid rate, the actual printing of a complete line of copy may be accomplished within one of these cycles and the backing electrodes press the recording web into contact with the electrodes only during this cycle so as to avoid burnishing or tearing of the recording web or marked slow-down or drag on the characters as they move past the printing station. By bringing the electrodes on both sides of the printing gap into contact with the recording web during the application of the pulse, reliability problems inherent in air gap discharges are completely eliminated from the system.

Provision is also made for the inclusion of more than one printer in the system so that multiple copies of the printer output may be produced simultaneously. This result is achieved by mounting multiple printers adjacent each other and locking their mechanical drive systems together so that they operate in tandem. Then by merely connecting the electrical inputs of each of these printers in parallel to the activating circuitry of the system, duplicate prints are produced by each printer. Any number of duplicate copies of the printer output may thus be produced according to the number of printers in the system. Advantageously, the printing head drive mechanism may be left mechanically coupled into the overall drive system of each of the printers, and the number of copies desired may be selected by electrically switching individual printers in and out of operation as required.

There is also provided a recording web feed mechanism including a recording web roll brake, a recording web tensioning arm and tension detector and a web feeding mechanism for advancing the web through the printer one line at a time in conjunction with the printing operation. A special spring-loaded web tensioning arm also carries the web roll drum mounting brake in such a way that it is released when a predetermined amount of tension is applied to the web by the feeding rollers.

A special fusing mechanism is employed in the system and is kept in a heated standby condition even when no printing input is being fed into the system. This continuous heating of the fuser is made possible by the provision of a mechanism for moving the fuser or at least the heated portion of the fuser out of contact with the recording web when the printer stops recording for a predetermined time.

For a clearer understanding of the above and still further objects, features, and advantages of the invention, reference is now made to the following detailed description of the invention and the accompanying drawings in which.

Figure 1:
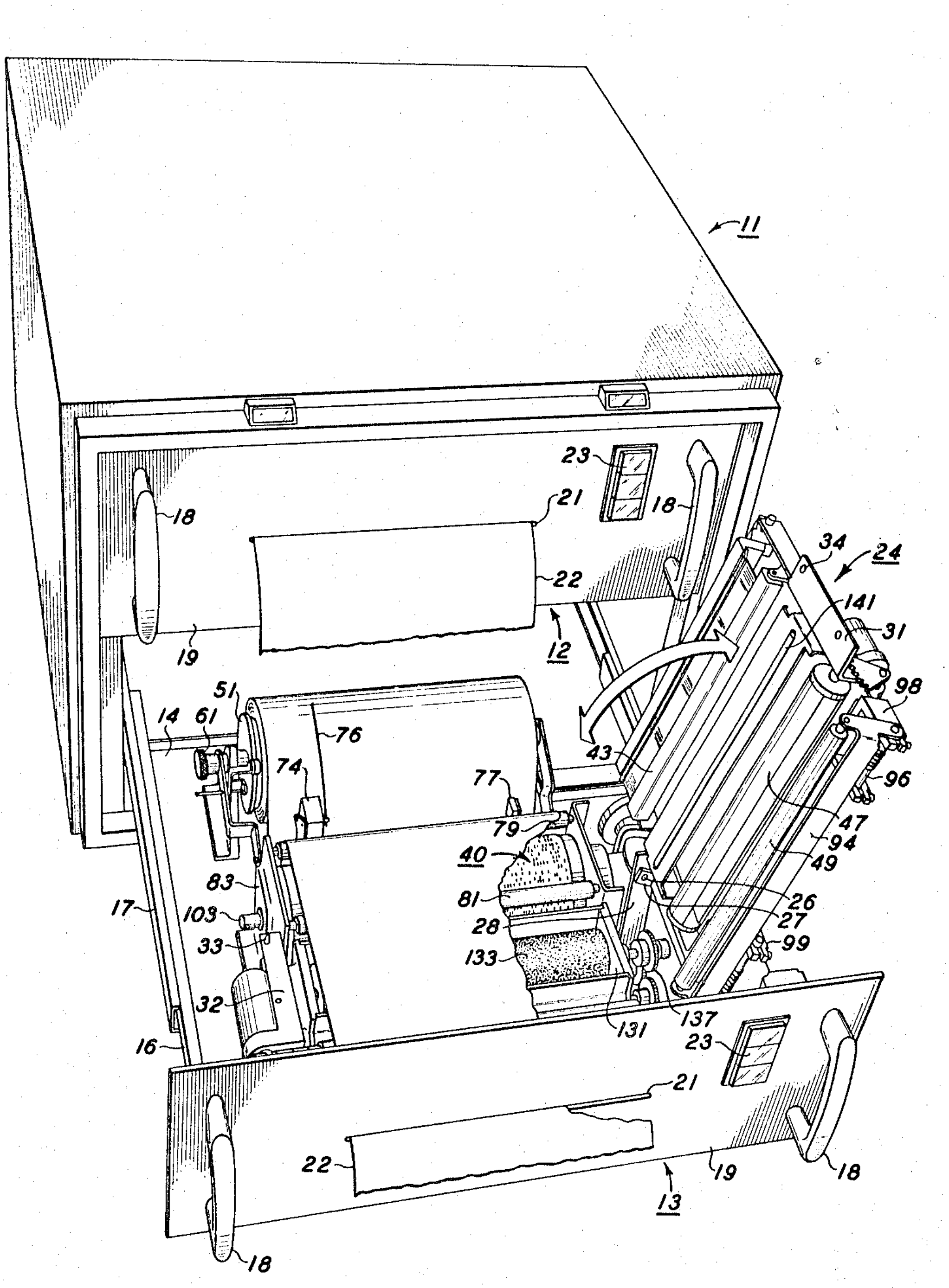
FIGURE 1 is a left-hand top perspective view of a multiple communications printer according to the invention with one printer drawer pulled out and the upper portion of the printer pivoted up off the recording web.
Figure 2:
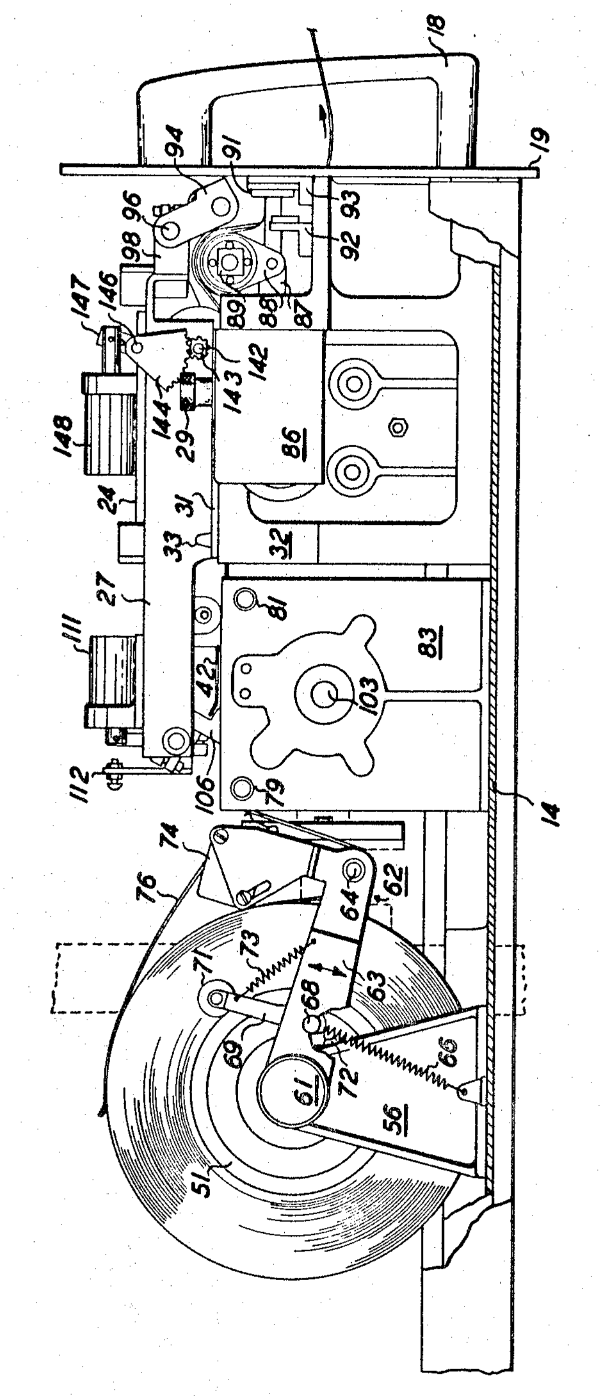
FIGURE 2 is a left side view of a single printer unit with the supporting slides partially broken away to show the relationship of the parts to the base plate of the printer.
Figure 3:
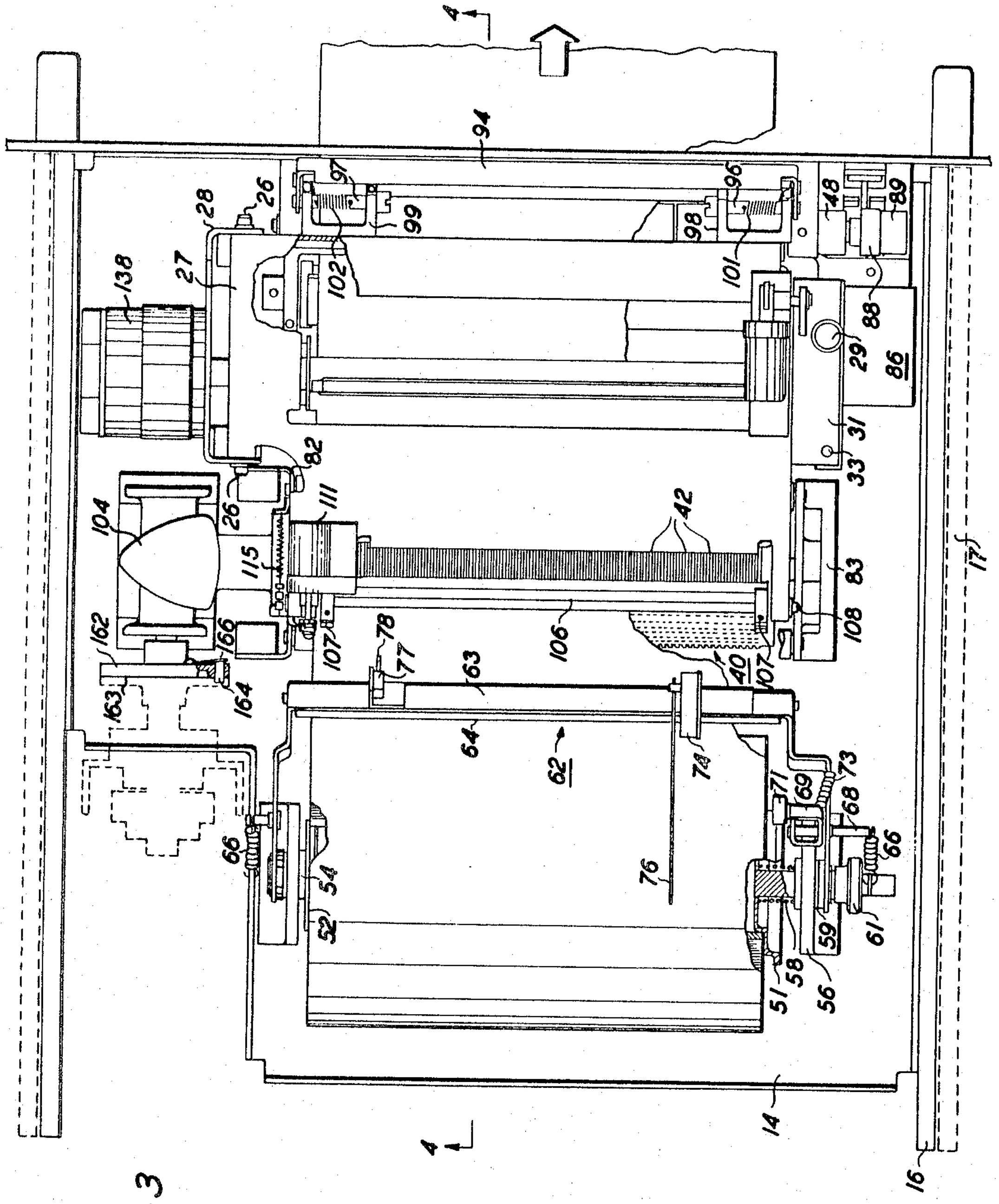
FIGURE 3 is a top plan view of a single printer unit partially broken away to show the configuration of various parts in the unit and showing the cabinet slides and the cabinet drive coupling in ghost outline.

Referring now to FIGURE 1, there is seen a multiple printer cabinet generally designated 11 in which there are mounted two duplicate units generally designated 12 and 13 respectively. Each of printer units 12 and 13 is on a base plate 14 with side rails 16 which are mounted in guide tracks 17 connected to cabinet 11 so that the printers can be slid in and out of the cabinet 11 for the easy servicing and replacement of supplies. This movement of the printers in and out of the cabinet is readily accomplished by grasping printer handles 18 on face plates 19 of the printer units to either pull the units out of cabinet or push them back inside the cabinet after servicing has been completed. The face plates 19 of the printers are also provided with slots 21 through which the recording webs 22 exit from the printers. Each of the face plates 19 is also provided with a series of indicator lights 23 to indicate when the machine is on, when the recording web supply is low or when a break occurs in the recording web during operation. In each printer, an upper printer sub-assembly 24 is mounted on pivot pins 26 so that it can be opened as shown in FIG. 1, by pivoting it up and away from the recording web feed path. The pivot pins 26 connect the frame 27 of this upper sub-assembly to standards 28 which are mounted on the base 14 of the printer. This mounting arrangement is best seen in FIGURES 1 and 3. As best seen in FIGURES 2 and 3, a set screw 29 is employed to hold the end of the pivoted upper printer sub-assembly down in the operating position through a flange 31 on frame 27 with the flange bearing on a side frame member 32. A locating pin 33 is also provided on side frame member 32 to mate with a hole 34 in flange 31 so that the upper printer sub-assembly is properly aligned with the remainder of the printer when it is in operating position.

GENERAL MACHINE OPERATION

Figure 4:
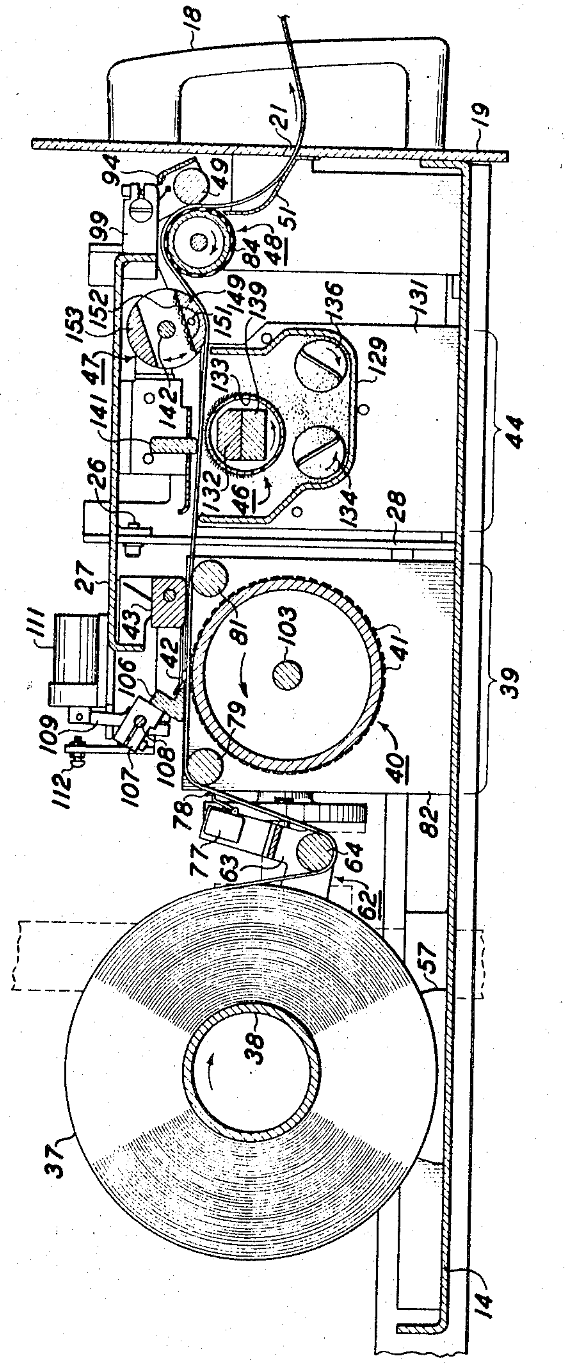
FIGURE 4 is a left side sectional view of a single printer unit taken along section line 4—4 of FIGURE 3.
Figure 6:
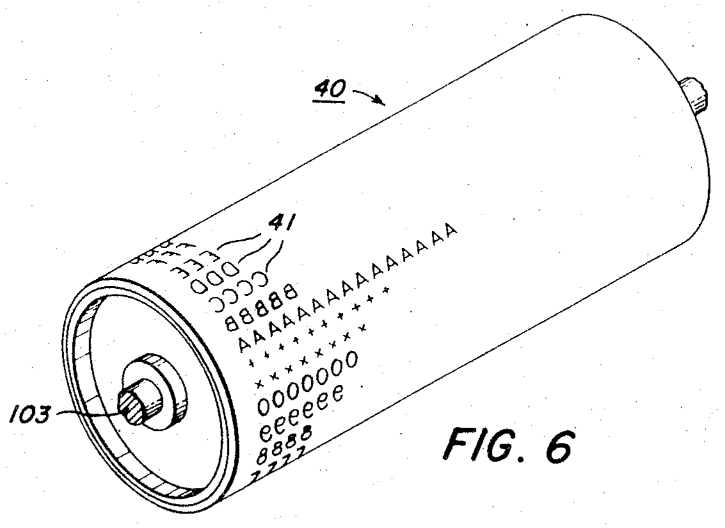
FIGURE 6 is a partially diagrammatic isometric view of the character cylinder.

Broadly speaking, the operation of the overall apparatus entails forming a latent electrostatic image on a recording web, developing this image with finely divided electroscopic marking particles and heat fusing these particles to the recording web to permanently fix the image thereon. In carrying out these operations, the recording web is first fed off a spool of recording web material 37 mounted on a reel 38 as best seen in FIGURE 4. The recording web is then guided through an electrostatic recording station generally designated 39 where a latent electrostatic image of the printing to be recorded is applied to the web. In the embodiment of the invention illustrated in FIGURE 4, the recording station employs a rotating alphanumeric character cylinder generally designated 40 which constantly rotates at high speed in the direction indicated by the arrow. This character cylinder which is also seen in FIGURES 1 and 3 and which is shown in detail in FIGURE 6, contains 80 duplicate character discs along its axial length. Each character disc is made up of a number of raised, alphanumeric, character-shaped electrodes 41 arranged in a line around the circumference of the cylinder. Although 64 different numbers, letters, and arbitrary symbols including punctuation and the like are employed in each of the character discs shown, any number desired may be used and any number of discs may be arranged along the axial length of the character cylinder so as to print lines of different widths. Above the recording web and opposite the uppermost portion of the character cylinder as seen in FIGURE 4 are 80 individual spring wire, conductive metal backing electrodes 42 with one being provided for each character disc on the character cylinder. As best seen in FIGURES 3 and 4, each one of these backing electrodes is aligned with one of the character discs on the character cylinder and each backing electrode is insulated from all of the other backing electrodes by virtue of its mounting in an insulating holder bar 43. During recording, the backing electrodes 42 press the recording web against the raised characters 41 on character cylinder 40 and then by selectively applying a pulse between individual backing electrodes and the character cylinder at selected times in the rotation of the cylinder, electrostatic images of the desired characters are recorded along the whole 80 character width of the recording web. Following recording of this line of latent electrostatic character images on the recording web, backing electrodes 42 are raised off the recording web and it is advanced through the system a distance equal to the height of one line to prepare it for the next line of recording. After the web passes through the recording station 39, it enters a developing station generally designated 44 in which a magnetic brush developing unit generally designated 46 deposits finely divided, thermoplastic, electroscopic marking particles on the recording web in conformity with the pattern of electrostatic charge formed on the web at the recording station. After passing through the developing station 44, the recording web then passes under a heat fuser generally designated 47 which melts the thermoplastic developer particles causing them to fuse onto the recording web surface. The recording web then passes between the bite of a feed roller 48 and a spring biased idler roller 49, which presses the recording web against the feed roller, and proceeds down a guide shoot 51 and then out of the machine through slot 21 in face plate 19 of the printer.

RECORDING WEB FEED MECHANISM

As pointed out above, the recording web comes off a roll of recording web material 37 mounted on a reel 38. The reel 38 is mounted at its ends on the flanged portions 51 and 52 of two shafts 53 and 54, respectively. Shafts 53 and 54 are journaled for rotation in upright standards 56 and 57, respectively, each of which is fastened to base 14 of the printer assembly. As best seen in FIGURE 3, a cylindrical spring 58 encircles shaft 53 between standard 56 and the flanged end portion 51. This spring serves to force flange 51 against the end face of reel 38 so that the opposite end of the reel is pressed against the longitudinally flange 52 of shaft 54. Shaft 53, is, of course, slidably mounted in its journal 59 and a handle 61 is fixed to the end of shaft 53 most remote from flange 51. This handle acts as a stop to limit the movement of shaft 53 caused by spring 58 and is also employed to pull the flanged end 51 of the shaft away from reel 38 when the roll of recording web material is replaced.

A U-shaped (as seen in FIG. 3) tensioning arm assembly 62 also has its ends mounted for pivotable movement on shafts 53 and 54. This tensioning arm assembly pivots about the axis of the two shafts as indicated by the arrow on the assembly as shown in FIGURE 2. The assembly includes a U-shaped sheet metal frame member 63 in which an idle roller 64 is journaled for rotation. As can be seen in FIGURE 3, this idle roll extends well beyond the ends of the recording web which passes beneath it when the web is threaded through the printer. This idle along with the whole tensioning arm assembly is biased in the downward position as seen in FIGURE 2 by a pair of hold-down springs 66 as best seen in FIGURES 2 and 3. These springs connect the base 14 of the printer to a pair of pins 67 and 68 mounted on the arms of the U-shaped frame 63. A braking arm 69 is also mounted for pivotal movement on pin 68, the upper end of braking arm 69 carries a rubber brake shoe 71 which engages with the outermost portion of the flange 51 on shaft 53 when abutting stop 72, which is also carried by braking arm 69, is engaged by the front face of standard 56 as best seen in FIGURE 2. A spring 73 is also provided connecting a remote end of the braking arm 69 with the tensioning arm assembly 63. Spring 66 is significantly stronger than spring 73 so that until the tensioning arm assembly 63 (as seen in FIGURE 2) is raised against the action of spring 66, the pressure of abutting stop 72 pressing against upright standard 56 causes the rubber brake shoe on braking arm 69 to press up strongly against flange 51 to prevent the complete recording web roll from rotating. As soon as the tensioning arm assembly is raised against the action of spring 66, abutting stop 72 pivots away from upright standard 56 allowing spring 73 to pivot braking arm 69 down about pin 68 and out of contact with flange 51. This pivoting action of arm 69 about pin 68 causes the direct line distance between the brake shoe 71 and the center of the flanged shaft to increase so that the face of the brake shoe moves out of contact with the edge of the flange. As soon as the tensioning arm assembly 62 is allowed to return to the lower position in response to the action of springs 66, engagement of the abutting stop 72 against upright standard 56 again causes the brake shoe 71 to engage flange 51 thereby preventing free wheeling of the recording web drum.

Also mounted on the U-shaped frame 63 of the tensioning arm assembly is a microswitch 74 operated by a feeler arm 76. This microswitch is employed to operate the "paper low" indicator light 23 on the front panel of the printer and is set so that when the feeler arm 76 reaches a predetermined low position where only a few more feet of recording web are left on the reel 38, the switch is activated and the light goes on. As best seen in FIGURES 3 and 4, a second microswitch 77 is also carried by tensioning arm assembly 62 and is activated by a short feeler arm 78. This feeler arm 78 bears against the tensioned recording web as it passes through the device and its tension is released as by a break in the recording web. The microswitch is immediately activated to operate one of the indicator lights 23 on the front panel of the device so as to alert the operator to a recording web break. This switch is also employed to turn off the recording pulse in-put, stop the recording web feed and remove the fuser from contact with the recording web. After passing beneath idle roller 64 on the tensioning arm assembly and feeler arm 78 on the microswitch, the recording web passes over two guide rollers 79 and 81. These guide rollers are journaled for idle rotation in a pair of side frame members 82 and 83. After the recording web passes over idle rollers 79 and 81 and through the printing station 39, it passes through the developing station 44 under the fuser 47 and then between feed roller 48 and idle roller 49 which together serve to advance the recording web through the printer. The feed rollers 48 is a metal core roller coated with a rubber sheath 84 to provide good frictional contact between this roller and the recording web during feeding. The feed roller 48 is indexed forward periodically enough to advance the recording web a distance equal to the height of one line of characters through a one-way clutch arrangement 89 operated by a feed roller crank 88 which is driven through the shaft 87 of a solenoid 86 mounted on side frame member 32. A flange 91 is also mounted on the end of solenoid shaft 87 and is large enough so that it will abut up against two stops 92 and 93 mounted on side frame member 32 so as to precisely delimit the length of travel of the solenoid shaft. This, in turn, provides for a precise degree of rotation of feed roller 48 each time solenoid 86 is actuated. Idle roller 49 is mounted at both ends for rotation in a U-shaped sheet metal frame member 94 as best seen in FIGURES 1–4. This frame member in turn is mounted for pivotable movement about a pair of shaft pins 96 and 97 which are mounted in two C-shaped brackets 98, 99, each of which is fastened to the frame of the upper printer sub-assembly 27. One end of each of a pair of cylindrically wound springs 101 and 102 is inserted in a hole in fixed shafts 96 and 97, respectively, while the other end of each of these springs is inserted in a hole in the side of U-shaped frame member 94 as best shown in FIGURES 2–4. This causes roller 49 which is carried by the frame member 94 to bear strongly against the recording web between it and the feed roller 48 when the upper pivoted printer sub-assembly is brought down into the operating position.

Accordingly, when feed roller 48 is rotated, it advances the recording web and tension thus applied on the recording web raises the tensioning arm assembly by applying an upward component of force on idle roller 64 so that brake 71 is released and the roll of printing web material 37 is allowed to advance.

ELECTROSTATIC RECORDING STATION

As briefly explained above, the recording station includes a character cylinder generally designated 40 carrying a plurality of raised alphanumeric character shaped electrodes 41 thereon. These character shaped electrodes 41 are in the shape of alphabetical letters, numbers, punctuation, or any other arbitrary symbol as desired. In this embodiment of the invention, the raised character shaped electrodes 41 are arranged in 80 identical circumferential discs with each disc carrying the same symbol in the same position around the circumference of the drum as shown most clearly in FIG. 6. In this particular drum, 64 differently shaped electrodes are provided in each disc and 80 discs are provided along the axial length of the drum. However, each of these numbers may be varied as required to fit the circumstances. Preferably, each of the raised character shaped electrodes is made of a conductive material and rests directly on the common electrically conductive drum 40. The drum has an axial shaft 103 which is journaled for rotation in two upright side frame members 82 and 83. The shaft 103 is directly driven at a high rate of speed through a gear box 104 as best seen in FIGURE 3.

As explained above, a plurality of springy conductive metal backing electrodes 42 are provided on the side of the recording web opposite character cylinder 40 and are mounted in an insulating holder bar 43 so that all of electrodes 42 are insulated one from the other. A backing is provided for each of the 80 character discs on character cylinder 40. Each of the backing electrodes 42 is mounted in holder bar 43 at such an angle that they tend to bear down on the recording web, pressing it against the character cylinder. Each of the electrodes 42 is connected to a pulse source (not shown) so that a pulse may be applied to each of these electrodes at a selected time in the rotation of character cylinder 40. In this way, a complete line of latent electrostatic images corresponding to a line of the information to be printed out can be recorded on the recording web during one rotation of the alphanumeric cylinder 40. As stated above, the angle of mounting and the springiness of the metal backing electrodes 42 causes these backing electrodes to bear down on the recording web during that cycle of rotation of character cylinder 40 when a line of characters is recorded on the web. Once this line of characters has been completed and the web is ready to be advanced for recording of the next line of information to be recorded, the backing electrodes 42 are cammed up away from the recording web by an insulating cam 106 mounted on a pair of end brackets 107 as best seen in FIGURES 3 and 4. These end brackets in turn are mounted for rotation about a pair of pins 108 which are fixed in the upper printer frame 27. The end brackets 107 and the cam are caused to rotate about pins 108 by the movement of a lever arm 109 actuated by a solenoid 111. A stop 112 is also provided to limit the reciprocal movement of the solenoid. A spring 115 has one end connected to the frame 27 of the upper printer sub-assembly and the other end connected to a portion of lever arm 109 below pin 108 so that the spring constantly biases the cam into a position where it will raise the backing electrodes 42 and the solenoid 111 must be actuated to allow the backing electrodes to press down on the recording web. The spring is best seen in FIGURE 3.

Figure 7:
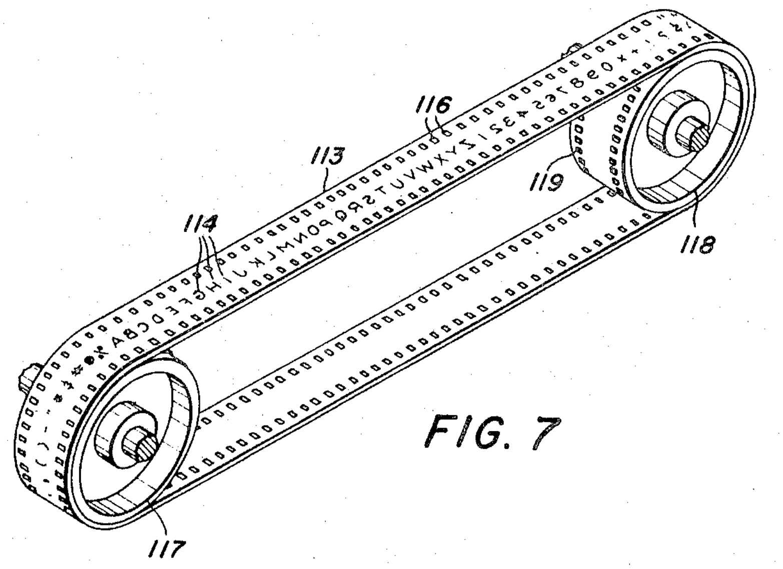
FIGURE 7 is an isometric view of a character electrode tape which is an alternate embodiment of the cylinder.
Figure 8:
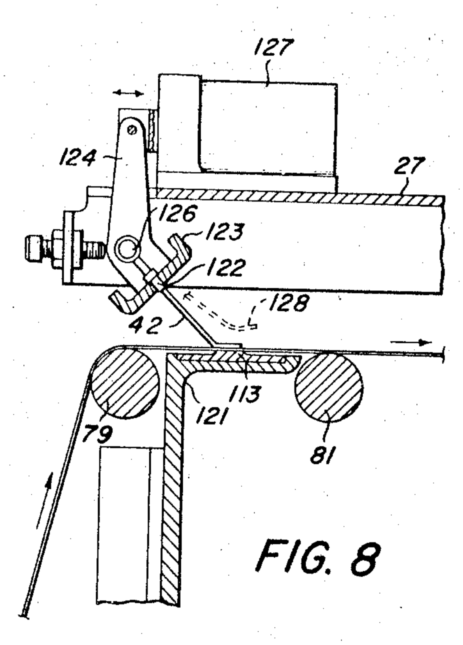
FIGURE 8 is a side sectional view of the character tape and its support along with an alternate backing electrode mechanism.

It should, of course, be recognized that many alternate embodiments of various portions of the invention may be substituted in the printed while still coming within the scope of the invention. For example, the character cylinder illustrated in FIGURES 1–4 and 6 may be replaced with an endless flexible character type 113 as illustrated in FIG. 7. This tape is also preferably made of an electrically conductive material and bears raised electrically conductive alphanumeric characters 114 of the same type employed in connection with the character drum illustrated in FIGURE 6. Instead of moving the various characters past the backing electrode in a direction which is generally parallel to the direction of movement of the recording web through the printer, the endless tape is mounted in the printer so that the characters move past the backing electrodes in a direction perpendicular to the direction of movement of the recording web or, in other words, in a direction parallel to shaft 103 of the original character cylinder as seen in FIG. 4. The belt is provided with a plurality of sprocket holes 116 and is entrained about a pair of pulleys 117 and 118 provided with sprockets 119 which mate with sprocket holes 116 in the endless belt. The shaft of one or both of these pulleys may then be directly driven through a gear box in the same manner employed to drive the alphanumeric character cylinder illustrated in FIGURE 6 with appropriate changes in gear ratios, as required. As best shown in FIGURE 8, the tape 113 runs between the pulleys in a grooved guide platen 121 so that the characters are kept in perfect alignment with the backing electrodes.

Figure 9:
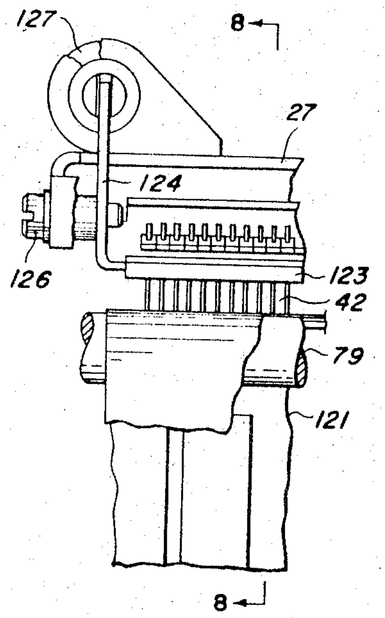
FIGURE 9 is an end view of the FIGURE 8 apparatus.

Alternative mechanisms may also be employed for moving the backing electrodes 42 in and out of pressing contact with the recording web. Thus, for example, as shown in FIGURE 8, the electrodes 42 are mounted in insulating sleeves 122 in a U-shaped channel bar 123, the end of which is fixed to a lever arm 124 mounted for pivotal movement about a pin 126 which in turn is mounted on the upper printer frame 27. The end of lever arm 124 most remote from the backing electrodes 42 is moved in the directions shown by the arrow in FIGURE 8 by a solenoid 127 which contains an internal spring biasing the backing electrodes toward the raised position 128 until the solenoid is actuated. An end view of this alternative embodiment of the backing electrodes lifting mechanism is shown in FIGURE 9.

IMAGE DEVELOPING MECHANISM

Once the latent electrostatic image has been formed on the recording web, it passes into the developing mechanism which deposits finely divided, colored electroscopic marking particles on the web in accordance with the pattern of the latent electrostatic image. The developing mechanism includes an elongated container 129 mounted between upright end frame members 32 and 131 which thus serve as the ends of the container. These features are best seen in FIGURES 1, 2 and 4. Also mounted between the end frame members is a magnetic assembly 132 surrounded by a cylindrical non-magnetic shield 133. Both this non-magnetic shield 133 and a pair of sheet metal helical screw agitators 134 and 136 are journaled for rotation in upright frame members 32 and 131. Shafts on each of these elements extending out beyond frame member 131 are geared together as shown at 137 in FIGURE 1. This gearing is arranged so that the gear connected to the shaft of shield 133 meshes with that connected with the shaft of agitator 134 and this gear in turn meshes with the gear on the shaft of agitator 136. Thus, non-magnetic shield 133 and agitator 136 rotate in the same direction while agitator 134 rotates in the opposite direction as shown by the arrows in FIGURE 4. The geared shaft of non-magnetic shield 133 is directly driven by a motor 138 best seen in FIGURE 3. In operation then, the counter-rotating agitators feed or kick up a mixture of finely divided electroscopic colored marking particles and magnetic material such as iron filing to the rotating non-magnetic shield 133 and a magnetic brush made up of bristles formed through the action of the magnetic field on the developing material mixture is brought in contact with the recording web bearing the latent electrostatic image formed at the printing station 39. Since the finely divided electroscopic marking particles in the developing mixture are triboelectrically charged by rubbing against the iron filings to a polarity which is opposite to the polarity of the latent electrostatic image recorded on the recording web, these marking particles deposit out on the electrostatic image. A steel bar 139 placed beneath magnet 132 shunts the lower portion of the magnetic field as seen in FIGURE 4 so that once the magnetic brush passes the recording web, the field collapses and the developing mixture forming the brush on the outside of the non-magnetic shield falls back into the bottom of container 129 for reuse in developing a later image. In order to improve the quality of the developed image and reduce background, a counter electrode 141 is provided on the opposite side of the recording web from the magnetic brush and a biasing voltage of about 100 to 200 volts D.C. of the same polarity as the charge applied to the recording web by backing electrodes 42 in forming the image is advantageously applied to this counter electrode to prevent the formation of spurious background deposits of developer in non-image areas on the recording web. Reference is made to many patents and literature sources in the xerographic arts for a detailed teaching of developing material mixtures which are useful in operating this developing mechanism.

FUSING MECHANISM

Once the recording web passes the developing station 44, the pattern of finely divided, colored thermoplastic marking particles is heat fused to the recording web by being brought in contact with fuser 47. The fuser mechanism is generally cylindrical and is mounted on a pair of end shafts 142 journaled for rotation in downwardly depending side portions of the frame 27 of the upper printer sub-assembly. As seen in FIGURE 2, a pinion 143 is keyed to shaft 142 and meshes with a large gear segment 144. The gear segment 144 is mounted for rotation upon a small shaft 146 fixed to frame 27 and is rotated by a lever arm 147 connected to a reciprocating solenoid 148, so that actuation of relatively short throw solenoid 148 can be used to cause 180° rotation of the fuser 47. The heated side of the fuser itself is made up of a cylinder segment of steel 149. A hollowed out portion in the back of segment 149 contains a "Thermistor" or any other suitable temperature detector encapsulated in a heat resistant plastic resin and an electrical resistance heater screen 152 is provided behind this assembly. By incorporating the thermistor into the fuser design, the temperature of the fuser is closely controlled through regulation of the current flow to the resistance heater 152 regulated by a feed back signal from the thermistor. Motion of the colder web is thus readily sensed by the thermistor, maintaining constant fusing temperature. An additional unheated cylinder segment 153 is also provided so that when the fuser is rotated 180° from the position shown in FIGURE 4, this unheated segment will contact the recording web. Since heated fuser contact with the recording web can be terminated almost instantaneously when recording web feed stops, the fuser may be maintained at a relatively high temperature without fear of scorching or burning the web.

Figure 10:
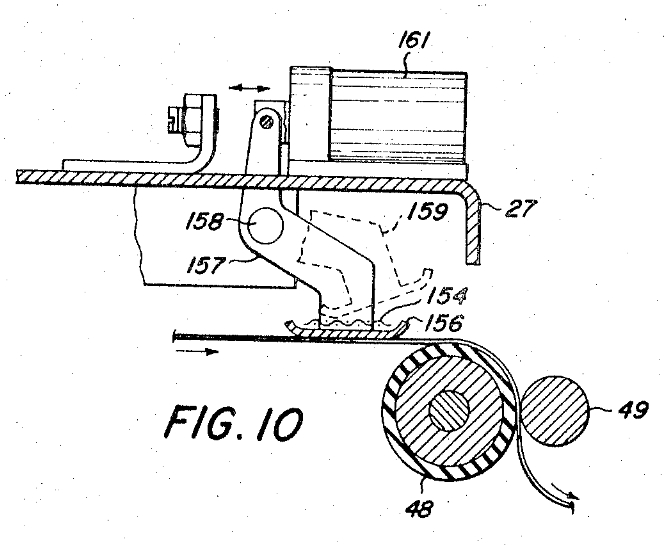
FIGURE 10 is a side sectional view of an alternate embodiment of the heat fuser and the mechanism for moving it into and out of contact with the recording web.

Here again, it is to be understood that alternative embodiments of the fuser may be incorporated into the printer without departing from the spirit and scope of the invention. One of these embodiments is shown by way of example in FIGURE 10, where an electrical resistance heater grid 154 is positioned closely in back of a heat conductive platen 156 which bears down on the recording web when in operating position. Platen 156 is connected to a lever arm 157 mounted for pivotal movement about shaft 158 so that heater platen 156 can be pivoted out of contact with the recording web into ghost outline position 159 by the actuation of a solenoid 161 which is connected to the end of lever arm 157 most remote from platen 156.

MULTIPLE PRINTER COMMON DRIVE MECHANISM

Figure 5:
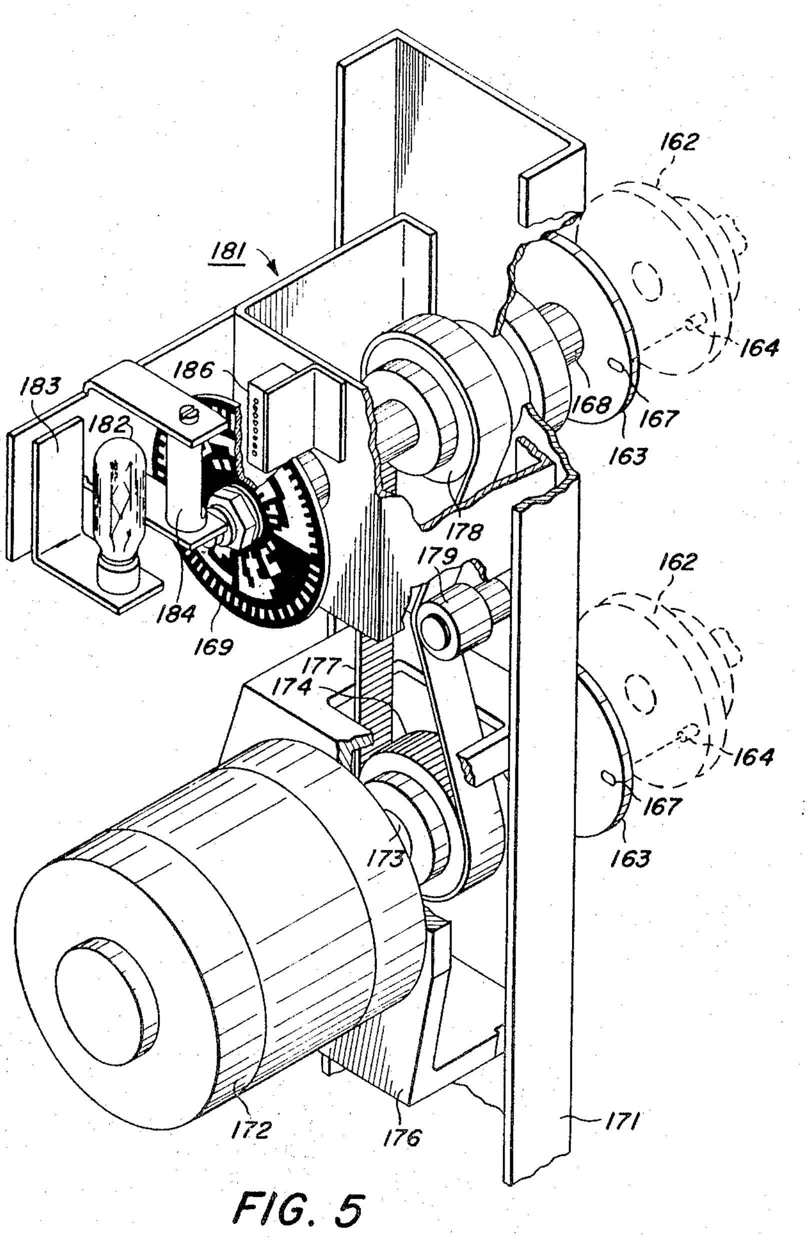
FIGURE 5 is a left upper rear isometric view of the common printer drive mechanism and the binary coded character position wheel.

As stated above, each of the character cylinders in each printer is driven through a gear box 104. The input drive shaft of each of these gear boxes carries a clutch plate 162 which engages a similar clutch plate 163 when the printer is fully slid into the main cabinet where clutch plate 163 and its associated drive mechanism is permanently mounted. Each of clutch plates 162 carries a pin 164 biased towards clutch plate 163 by a leaf spring 166. These features are best seen in FIGURES 3 and 5. Each of clutch plates 163 contains a hole 167 adapted for mating with pin 166 when the two clutch plates are in exact angular alignment with each other. Until this exact angular alignment between the two plates occurs and the pins mate with holes 167 by virtue of the pressure exerted by leaf springs 166 the clutch plates are allowed to slip with respect to each other. Generally, however, within a few rotations of clutch plates 163 pins 164 come into alignment with holes 167 and the plates are positively engaged with each other. This exact angular alignment of clutch 162 and 163 with respect to each other is an important feature of the invention since a binary coded character position disc is also mounted on the shaft 168 which carries the upper clutch plate 163 as seen in FIGURE 5 and the angular position of this shaft with respect to the angular position of the character drum must always be exact so that the position signal generated by the binary coded character disc 169 will correspond with the actual character which is opposite backing electrodes 42 at the time the signal is generated. The whole common drive mechanism for the multiple printers is mounted on an upright channel 171 which is positioned inside the main cabinet 11. A motor 172 directly drives the shaft 173 upon which lower clutch plate 163 is mounted. In addition, a timing gear 174 is also mounted on shaft 173 for rotation therewith. An additional frame element 176 connected to channel 171 is also included to provide additional journal support for the motor and shaft 172 and 173. The geared timing belt 177 is entrained about timing gear 174 on shaft 173 and an identical timing gear 178 on shaft 168 so that the two shafts rotate at identical speeds. An idle roller 179 bears against timing belt 177 to keep it under tension so that the teeth on the timing belt engage with each of the timing gears 174 and 178. A second additional frame element 181 connected to channel 171 is used to provide additional support for shaft 168 and to support a number of additional elements described hereinafter. Binary coded character disc 169 contains 64 differently coded segments, one segment for each alphanumeric character around the periphery of a character disc on the character cylinder 40 with each of these coded segments corresponding to a specific one of the characters. The coding is accomplished by making different portions of each segment either transparent or opaque to light as can best be seen in FIGURE 5. A light source 182 mounted on a bracket 183 connected to frame member 181 provides a light beam which is focused to a line by a cylindrical lens 184 and this line of light then passes through the transparent areas of the various segments of the binary coded character disc 169 as they rotate past the line of light. A series of very small photodiodes (not shown) are mounted behind holes in a mask 186 so that light passing through the various combinations of transparent areas in each segment of character disc 169 can be used to operate a decoder 215 which generates a coded output corresponding to the character electrode positioned opposite the backing electrodes at that time.

Figure 11:
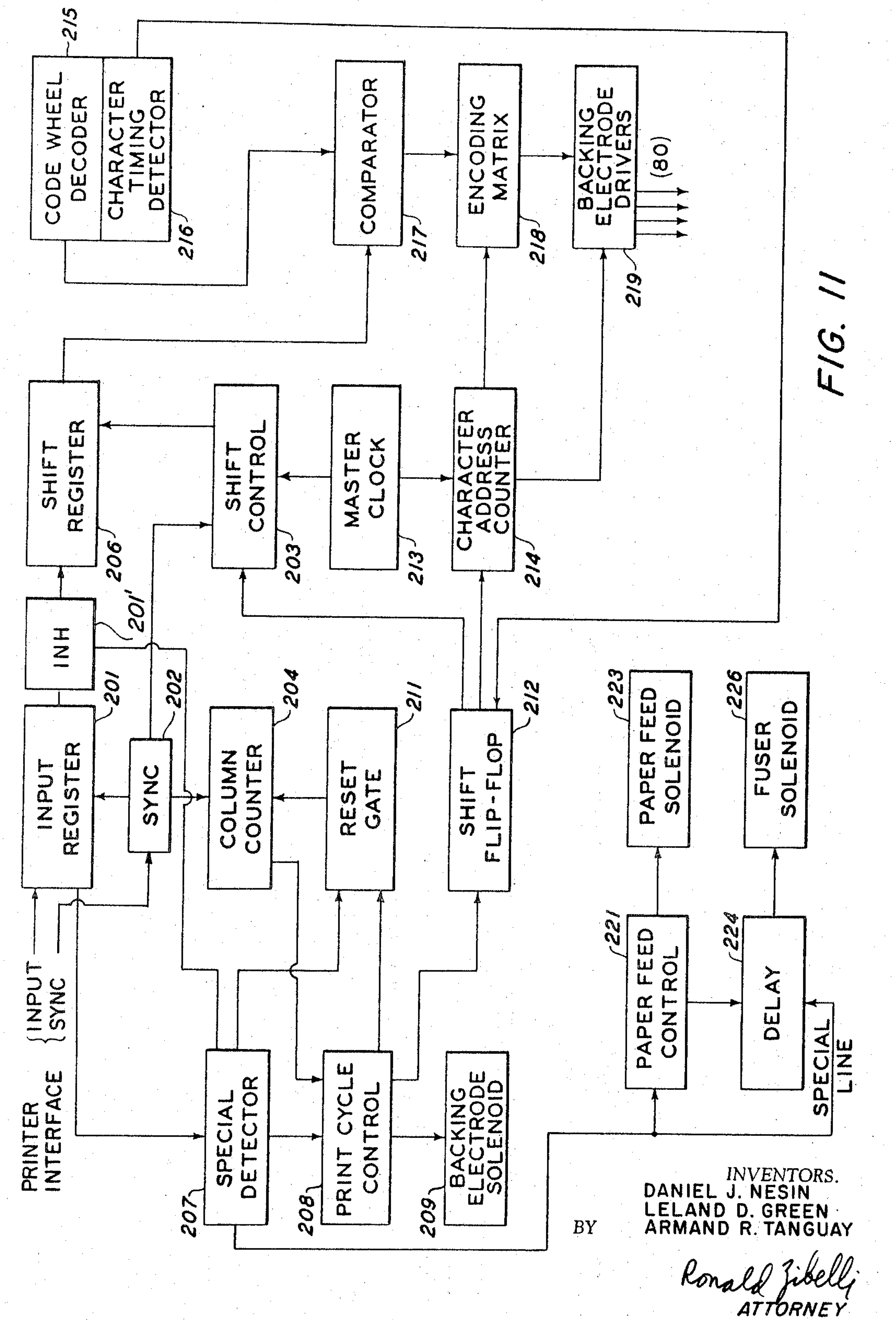
FIGURE 11 is an activating circuit.

As seen in FIGURE 11, binary coded input data enters an input register 201 on 8 lines (not shown). A sync pulse arrives with the input data, or alternately, a sync pulse generator 202 is also connected to register 201 and to a shift control 203 and a column counter 204. The input register 201 feeds coded data signals to shift register 206 through an inhibit gate 201′ controlled by the special detector 207. Detector 207 is employed to control the operation of the printer when it receives binary coded operational signals indicating the end of the line of printing, etc. By using an 8 line binary coded input, 128 different input signal combinations are provided—more than enough for 60 different alphanumeric characters, punctuation and other printing symbols and a number of operational signals as required. Signals from the column counter 204 and the special detector 207 are employed to activate print cycle control flip flop 208 which in turn activates backing electrode solenoid 209 causing the backing electrode fingers to move down into pressure contact with the back of the recording web. The print cycle control and special detector inputs are also employed to activate reset gage 211 to restart column counter 204 at the beginning of each line of recording. Another output line from print cycle control 208 is employed to activate shift flip flop 212 so that pulses from the character timing detector 216 may pass through it to the shift control 203. Flip flop 212 also starts character address counter 214 in conjunction with character timing detector 216. This character timing detector 216 produces a pulse for each binary coded segment on the coded disc so that one signal from the print cycle control 208 and the character timing detectors 216 activate the shift control 203 to cause the shift register 206 to recirculate its entire contents to comparator 217 each time another coded portion of the binary coded disc activates detector 216. At the same time code wheel decoder 215 signals the comparator according to the particular binary coded segment which happens to be in front of the light source at any particular time and when circulated signals from the shift register 206 coincide with signals from the decoder 215 in the comparator 217, a signal is fed from the comparator to an encoding matrix 218. The comparator input signal is addressed to a particular section of the encoding matrix 218 by a character address counter 214. Each of these sections of the encoding matrix correspond to one of a number of output lines corresponding to the number of backing electrodes which are to be driven by the system. A character address counter 214 serially addresses comparator output to sections of encoding matrix 218. Counter 214 also receives an input signal from master clock 213 as does shift control 203. When counter 214 has received a number of input pulses from the master clock 213 which corresponds with the number of characters in the line width to be printed, it fires a one shot printing pulse directly to the backing electrode drivers 219 causing those which have been activated from the encoding matrix to discharge. Everytime during printing one line of similar characters on all of the character discs of the character cylinder comes opposite the 80 backing electrodes, then the system contains input data, the entire contents of shift register 206 are circulated at the output of the register and compared with the code wheel readout which is, of course, an analog of the character position on the drum. Thus, for example, when the "a's" on each of the discs of the character electrode drum are opposite the 80 backing electrodes, all the "a's" in the line of type will be "printed" on the recording web, in the proper position on the line according to their serial position in the shift register 206. Since all of the other characters encoded in the shift register represent other letters which are coded differently, no pulse will pass through comparator 217 when this data is compared with the output signal from the code wheel decoder 215 and the comparator 217. This same procedure is repeated for the "b's," "c's" and all the other letters, numbers, and punctuation so that after one complete rotation of the alphanumeric character drum, a complete line of type is recorded on the recording web. Thus, it is seen that the shift register is recirculated to the comparator once for each character registered from the code wheel so that all of the information in the shift register for one line of printing is recorded in the proper position in the line when the proper character comes opposite the backing electrode at that position. A coincidence occurs for all information in the shift register after one complete rotation of the character electrode drum at most. Special coded signals detected by special detector 207 are employed to operate the feed paper feed control 221 which in turn activates the paper feed solenoid 223 to advance this recording web. This paper feed control 221 will not operate unless a signal is also received from a detector (not shown) indicating that shift register 206 is empty. There is also provided a delay circuit 224 which activates the fuser rotating solenoid 226 within any fixed period of time after the last paper feed signal provided that no input signal of new printing is received on the special line from the special detector 207.

What is claimed is:

1. A multiple copy electrographic recorder comprising at least two electrographic printers, each of said printers including a plurality of separate electrically conductive backing electrodes arranged in a line, a carrier member, a plurality of different alphanumeric character shaped electrodes mounted on said carrier, means to move said carrier so that said character electrodes repeatedly cycle past said backing electrodes, means to feed a charge retaining recording web between said carrier and said backing electrodes, means to apply short duration pulses between selected ones of said backing electrodes and said carrier when the desired characters are opposite said backing electrodes, a common drive means in said recorder for the carrier in each of said printers, a clutch mechanism for positively coupling said drive means to each of said carriers only when the common drive is at one position relative to the position of the carrier in its cycle, signal generating means actuated by said common drive means and adapted to produce an output signal analog of the position of each of said carriers in its cycle and pulsing control means adapted to compare input printing data with output signals from said signal generator to activate said pulsing means when selected characters are opposite selected backing electrodes to thereby produce a line of electrostatic character images on said recording web.

2. A recorder according to claim 1 in which said clutch mechanism comprises a clutch plate driven by said common drive means and a second clutch plate connected to the drive train of said carrier, one of said clutch plates having a single hole at one point in its face and the other of said clutch plates having a spring biased pin adapted to engage the hole in the other clutch plate when said pin and said hole come opposite each other as said common drive means rotates the first of said plates.

3. A recorder according to claim 1 in which said signal generator includes a light source, a character encoding disc made up of a plurality of angular segments having transparent and opaque areas thereon, said encoding disc being journaled for rotation about its central axis and connected to said common drive means for rotation thereby and a plurality of photodetectors on the opposite side of said encoding disc from said light source, said photodetectors being connected to an encoding matrix in said signal generator so that a signal generated in accordance with the particular combination of photodetectors activated by light shining through transparent areas of said encoding disc is an analog of the position of the alphanumeric character carrier in its cycle.

4. A recorder according to claim in which each of said printers is mounted in guide tracks in said recorder so that it can be moved in and out of the housing of said recorder with that portion of said clutch mechanism which is permanently associated with said recorder housing being so positioned therein so that it engages with that portion of said clutch mechanism associated with said printer when said printer is fully inserted in said recorder housing.

(References on following page)

References Cited

UNITED STATES PATENTS

| | | | |
|---|---|---|---|
| 2,714,841 | 8/1955 | Demer et al. | 101 |
| 2,905,299 | 9/1959 | Hildebrandt | 197—20 |
| 2,931,688 | 4/1960 | Innes et al. | 101 |
| 2,987,037 | 6/1961 | Bolton | 101 |
| 3,020,994 | 2/1962 | Kirk | 101—90 X |
| 3,023,731 | 3/1962 | Schwertz | 101 |
| 3,058,415 | 10/1962 | Hoffman | 101 |
| 3,060,432 | 10/1962 | Schwertz | 101 |
| 3,184,749 | 5/1965 | Groth | 101 |
| 3,194,674 | 7/1965 | Sakurai | 101 |
| 3,208,076 | 9/1965 | Mott | 101 |

ROBERT E. PULFREY, *Primary Examiner.*

E. S. BURR, *Assistant Examiner.*